United States Patent [19]

Kamimura et al.

[11] Patent Number: 5,060,970
[45] Date of Patent: Oct. 29, 1991

[54] SUSPENSION APPARATUS OF A VEHICLE

[75] Inventors: Shoichi Kamimura; Takeshi Edahiro; Shin Takehara; Hiroyoshi Kumada, all of Hiroshima, Japan

[73] Assignee: Mazda Motor Corporation, Hiroshima, Japan

[21] Appl. No.: 467,408

[22] Filed: Jan. 19, 1990

[30] Foreign Application Priority Data

Jan. 19, 1989 [JP] Japan ................... 1-10477

[51] Int. Cl.⁵ .............................................. B60G 11/27
[52] U.S. Cl. ................................... 280/707; 280/711; 280/714; 188/299
[58] Field of Search ............... 280/707, 711, 714, 840, 280/DIG. 1; 188/299, 99

[56] References Cited

U.S. PATENT DOCUMENTS 4,650,042  3/1987  Knecht et al. .................... 188/299
4,919,440  4/1990  Tsukamoto .................. 280/DIG. 1

FOREIGN PATENT DOCUMENTS 59-14365   4/1984  Japan .
61-282110 12/1986  Japan .
62-289417 12/1987  Japan .

Primary Examiner—Charles A. Marmor
Assistant Examiner—Tamara L. Finlay
Attorney, Agent, or Firm—Fish & Richardson

[57] ABSTRACT

A suspension apparatus of a vehicle has a cylinder unit interposed between a sprang weight and an unsprung weight, which changes a ride height of the vehicle body by supplying or discharging an operating liquid through a supply/discharge control valve. The supply/discharge control value is controlled on the basis of a predetermined condition so as to control a posture of the vehicle body. There are further provided a rebound detecting sensor for detecting a rebound of each of the wheels, which occurs further from a state in which the wheel is rebounded, and a pressure detecting sensor for detecting a pressure in the cylinder unit. When it is sensed by the rebound detecting sensor that the rebound occurs further from the rebounding state, if the pressure detected by the pressure detecting sensor is continued in an elevating state for a given period of time, it is judged that the supply/discharge control valve is in trouble.

30 Claims, 11 Drawing Sheets

SUSPENSION APPARATUS OF A VEHICLE

BACKGROUND OF THE INVENTION

1. Field of the Invention

The present invention relates to a suspension apparatus of a vehicle adapted to change suspension characteristics.

2. Description of Related Art

Recently, as a suspension apparatus of a vehicle is called an active suspension, it is proposed that the suspension apparatus is of a type in which its suspension characteristics can be changed in an arbitrary manner. The so-called active suspension is basically constructed such that a cylinder unit is interposed between an unsprung weight and a sprang weight and that the suspension characteristics are controlled by controlling a supply and discharge of operating liquid to and from the cylinder unit. Japanese Patent Publication (Kokoku) No. 14,365/1984 discloses a suspension apparatus which uses a cylinder unit as an actuator for adjusting a ride height of the vehicle body and which controls a posture of the body by controlling a pressure of the operating liquid in the cylinder unit.

In the so-called active suspension, suspension characteristics can largely be changed by supplying the operating liquid or discharging it to or from outside in order to carry out various control including control of the ride height of the vehicle body, control of a roll component of vibration of the body, control of a pitch component of vibration thereof, and so on.

In the active suspension, there has generally been used a ride height sensor for sensing the ride height of the vehicle body for control of the posture of the vehicle body so that the suspension control cannot be implemanted to a sufficient extent if the ride height sensor would be in trouble. Japanese Patent Unexamined Publication (kokai) No 289,417/1987 proposes that whether the ride height sensor is in trouble or not is judged by observing a velocity of changes in output values from the ride height sensor. Japanese Patent Unexamined Publication (kokai) No. 282,110/1986 proposes that a portion of plural ride height sensors is judged to be in trouble when output from the portion of the plural ride height sensors does not vary although outputs from the plural ride height sensors are actually varying.

It is thus to be noted that the active control of the suspension is impaired when a supply/discharge control valve for supplying or discharging the operating liquid to or from the cylinder unit is out of order, particularly when the supply/discharge control valve is fixed in such a state that the operating liquid is being supplied.

SUMMARY OF THE INVENTION

Therefore, the present invention has the object to provide a suspension apparatus of a vehicle capable of accurately sensing a state in which the supply/discharge control valve is in trouble in such a state that it is supplying the operating liquid.

In order to achieve the foregoing object, as diagrammatically shown in FIG. 13, the present invention consists of a suspension apparatus comprising:

a cylinder unit interposed between a sprang weight and an unsprung weight for changing a ride height by supplying or discharging an operating liquid;

a supply/discharge control valve for supplying to or discharging from the cylinder unit;

a supply/discharge control means for controlling supply of the operating liquid to or discharge of the operating liquid from the cylinder unit by controlling the supply/discharge control valve on the basis of a predetermined condition;

a rebound detecting means for detecting a rebound of a wheel, which further occurs when the wheel is rebounding;

a pressure detecting means for detecting a pressure in the cylinder unit; and a trouble judging means for judging a trouble of the supply/discharge control valve when the pressure detected by the pressure detecting means is continued in an elevating state for a given period of time when the rebound is detected by the rebound detecting means.

It can be anticipated that the pressure in the cylinder unit be lowered when the wheels are rebounded and, if the pressure would be elevated, this is caused by the fact that the operating liquid is kept supplied and the supply control valve is in trouble. With attention paid basically to this point, in order to improve an extent of the trouble judgment, there are added thereto conditions that the vehicle body be further rebounded from a rebounded state and that the pressure in the cylinder unit is elevating be continued for a given period of time.

Other objects, features and advantages of the present invention will become apparent in the course of the description of the preferred embodiments which follows, with reference to the accompanying drawings

DETAILED DESCRIPTION OF THE PREFERRED EMBODIMENTS

Figure 1:
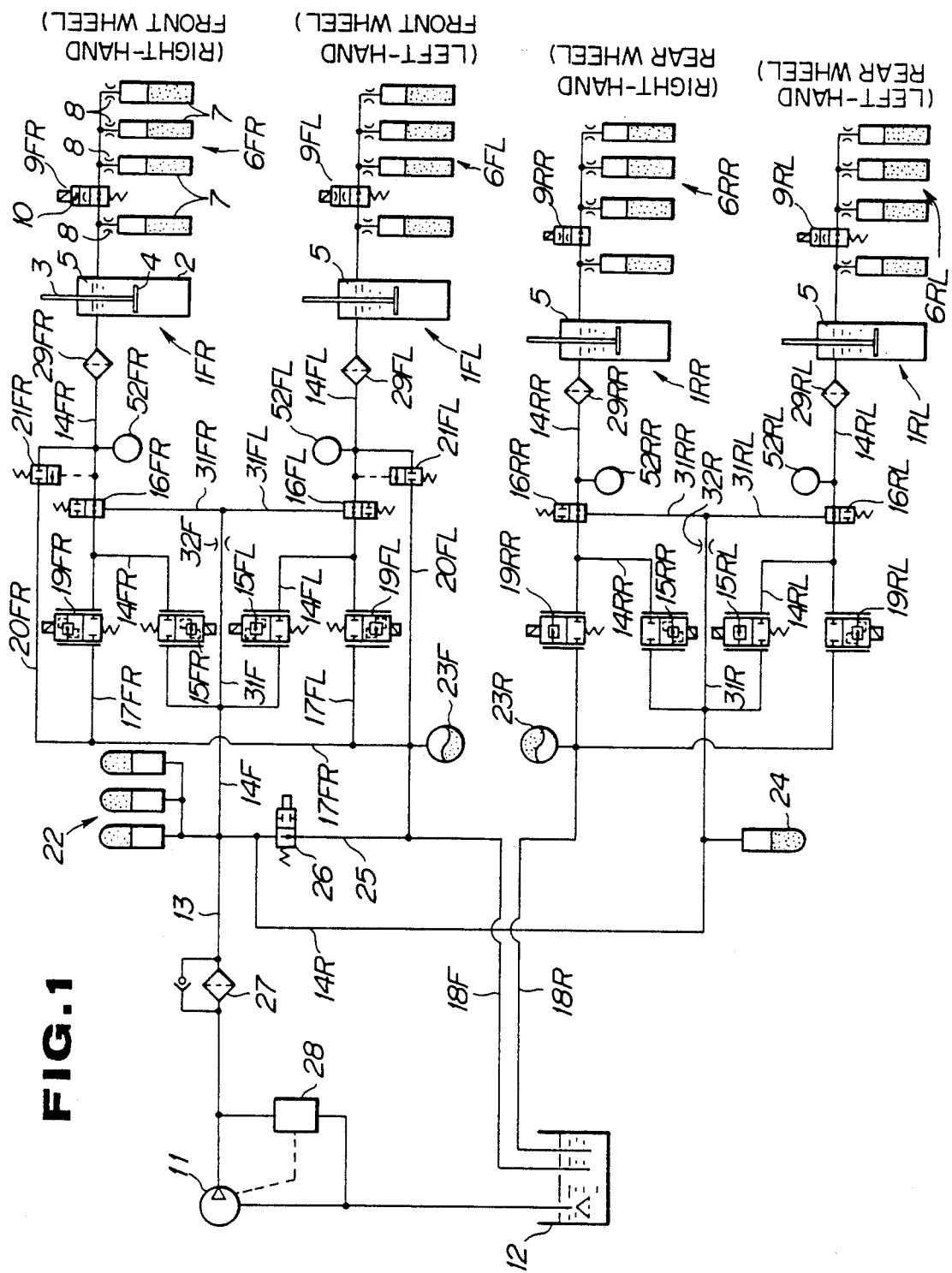
FIG. 1 is a schematic representation showing an operating liquid circuit according to one example of the present invention.

The present invention will be described more in detail by way of examples with reference to the accompanying drawings.

In the following description and the accompanying drawings, reference symbol "F" stands for a front wheel and "R" stands for a rear wheel, as well as reference symbol "FR" stands for a right-hand front wheel, "FL" for a left-hand front wheel, "RR" for a right-hand rear wheel, and "RL" for a left-hand rear wheel. When the front and rear wheels as well as the right-hand and left-hand wheels are not needed to be distinguished, reference numerals are referred to without using these reference symbols.

Operating Liquid Circuit

As shown in FIG. 1, reference numeral 1 denotes a cylinder unit which is mounted to each of the wheels, a cylinder unit mounted to the right-hand front wheel being referred to as 1FR, a cylinder unit mounted to the left-hand front wheel as 1FL, a cylinder unit mounted to the right-hand rear wheel as 1RR, and a cylinder unit mounted to the left-hand rear wheel as 1RL. Each of these cylinder units comprises a cylinder 2 connected to the unsprung weight and a piston rod 3 extending from the inside of the cylinder 2 and connected to a sprang weight. The cylinder 2 comprises the piston rod 3, a piston 4 integral with the piston rod 3, a liquid chamber 5 disposed upward and defined by the piston 4 and a lower chamber disposed downward of the liquid chamber 5 and communicated therewith. This structure allows the piston rod 3 to extend raising a ride height of the vehicle body when an operating liquid is fed to the liquid chamber 5 while lowering the height of the vehicle body when the operating liquid is discharged from the liquid chamber 5.

To the liquid chamber 5 of each cylinder unit 1 is connected a gas spring 6 (6FR, 6FL, 6RR, and 6RL) which comprises four cylindrical springs 7 of a small diameter and the four cylindrical springs 7 are arranged in a row, or in parallel to each other, and connected to the liquid chamber 5 through orifices 8. Three of the four cylindrical springs 7 are further connected to the liquid chamber 5 through a shift valve 9. This arrangement enables the four cylindrical springs 7 to be communicated with each other only through the orifices 8 when the shift valve 9 is located at a shift position as shown in the drawing, thereby making a damping force smaller at this time. When the shift valve 9 is shifted from the position as shown in the drawing, the three cylindrical springs 7 can be communicated with each other through an orifice 10 incorporated in the shift valve 9, too, thereby making a damping force larger. It is to be noted as a matter of course that a displacement of the shift positions of the shift valve 9 changes spring characteristics of the gas spring 6. Furthermore, it is to be noted that suspension characteristics can also be changed by an amount of the operating liquid to be fed to the liquid chamber 5 of the cylinder unit 1.

Referring to FIG. 1, reference numeral 11 denotes a pump to be driven by the engine, and the pump 11 raises a high-pressure operating liquid from a reservoir tank 12 and discharges the liquid into a common passage 13 as a supply passage. The common passage 13 is branched into a forward passage 14F and a rearward passage 14R, the forward passage 14F being further branched into a right-hand forward passage 14FR and a left-hand forward passage 14FL. The right-hand forward passage 14FR is connected to the liquid chamber 5 for the right-hand front wheel cylinder unit 1FR and the left-hand forward passage 14FL is connected to the liquid chamber 5 of the left-hand front wheel cylinder unit 1FL. To the right-hand forward passage 14FR are connected on the upstream side a flow rate control valve 15FR for supplying the operating liquid and on the downstream side a pilot valve 16FR as a delay valve. To the left-hand forward passage 14FL are connected on the upstream side a flow amount control valve 15FL for supplying and on the downstream side a pilot valve 16FL.

To the right-hand forward passage 14FR is connected a first relief passage 17FR for the right-hand forward passage at a position between the supply flow rate control valves 15FR and 15FL, and the first relief passage 17FR leads eventually to a reservoir tank 12 through a relief passage 18F for the front wheels. To the first relief passage 17FR is connected a discharge flow amount control valve 19FR. The right-hand forward passage 14FR disposed on the downstream side of the pilot valve 16FR is connected through a second relief passage 20FR as a bypass bypassing the discharging flow amount control valve 19FR to the first relief passage 17FR which is connected to a relief valve 21FR. The right-hand forward passage 14FR is provided with a filter 29FR at a position close to the cylinder unit 1FR. The filter 29FR is disposed at a position among the cylinder unit 1FR, the pilot valve 16FR disposed closer to the cylinder unit 1FR, and the relief valve 21FR, functioning as preventing dust abraded or worn off as a result of abrasion and so on from flowing toward the pilot valve 16FR and the relief valve 21FR.

It is to be noted that the arrangement for passages for the left-hand forward wheel is substantially the same as that for the right-hand forward wheel as have been described hereinabove, so that a duplicate description thereon will be omitted herefrom for a brevity of explanation.

To the common passage 13 is connected a main accumulator 22, and to the front-wheel relief passage 18F is connected an accumulator 23F. The main accumulator 22 serves as a source of accumulating pressures for an operating liquid in association with a sub-accumulator 24, as will be described hereinafter, and it functions as preventing an amount of the operating liquid to be supplied to the cylinder unit 1 from running short. The accumulator 23F prevents a high-pressure operating liquid in the cylinder units 1 for the front wheels from being discharged rapidly to the reservoir tank 12 of a low pressure, namely, prevents a so-called water-hammer phenomenon.

Passages for supplying or discharging the operating liquid to or from the cylinder units 1RR and 1RL for the rear wheels are constructed in a way similar to those for the front wheels so that a duplicate description will be omitted from the description which follows. It is to be noted, however, that the passages for the rear wheels are provided with no valves corresponding to the relief valves 21FR and 21FL for the respective cylinder units 1FR and 1FL and that the rear-wheel passage 14R is provided with the sub-accumulator 24 with the fact taken into account that a length of its rear-wheel passage from the main accumulator 22 becomes longer than that of the front-wheel passage.

The common passage 13, namely, each of the front-wheel passage 14F and the rear-wheel passage 14R, is connected to the front-wheel relief passage 18F through a relief passage 25 to which, in turn, is connected a safety valve 26 consisting of an electromagnetic switch valve.

In FIG. 1, reference numeral 27 stands for a filter and reference numeral 28 for a pressure governing valve for adjusting a discharge pressure from the pump 11 so as to be within a given range. In this embodiment, the pressure governing valve 28 is constituted such that the pump 11 is of a variable-displacement, swash plate type piston that is integrally incorporated into the pump 11. The pressure governing valve 28 can adjust the discharge pressure within the range from 120 to 160 kg/cm².

The pilot valve 16 is arranged so as to be shifted to open or close in accordance with a differential pressure between the pressures of the front-wheel passage 14F or the rear-wheel passage 14R, namely, between the pressure in the common passage 13 and that on the side of the cylinder unit 1. At this end, the front-wheel 14F is led to the front-wheel common pilot passage 31F which, in turn, is branched into two branch passages 31FR and 31FL, and the right-hand front wheel branch passage 31FR is connected to the right-hand pilot valve 16FR while the left-hand branch passage 31FL is connected to the left-hand pilot valve 16FL. The common pilot passage 31F is provided with an orifice 32F. A pilot passage for the rear wheels is arranged like the pilot passage 31F for the front wheels.

Figure 2:
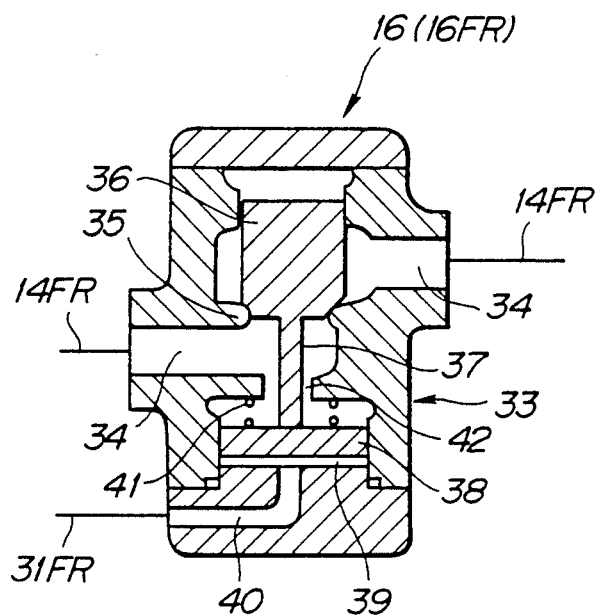
FIG. 2 is a sectional view showing one example of a pilot valve.

Each of the pilot valves 16 may be constructed as shown in FIG. 2. The pilot valve 16 as shown in FIG. 2 is directed to one for the right-hand front wheel, which is provided in a casing 33 with a main flow passage 34 constituting part of the right-hand forward passage 14FR to which the main flow passage 34 is connected. A valve seat 35 is provided in an intermediate position of the main flow passage 34 on or from which a switching piston 36 is seated or separated so as to close or open the piston valve 16FR, the switching piston 36 being slidably inserted into the casing 33.

The switching piston 36 is formed integrally with a control piston 38 through a valve stem 37. The control piston 38 is slidably inserted in the casing 33 and defines a liquid chamber 39 in the casing 33. The liquid chamber 39 is then connected to the branch pilot passage 31FR through a control flow passage 40. The control piston 36 is urged by a return spring 41 in the direction in which the switching piston 36 is being seated on the valve seat 35, in other words, in which the pilot valve 16FR is closed. Furthermore, the control piston 38 is designed such that a pressure of the main flow passage 34 acts upon the control piston 36 through a communication hole 42 on the side opposite to the liquid chamber 39. This arrangement allows the switching piston 36 to be seated on the valve seat 35 to close the pilot valve 16FR as the pressure in the liquid chamber 39 on the side of the common passage 13 has declined to one quarter or less than the pressure in the main flow passage 34 on the side of the cylinder unit 1FR. In this case, when the pressure on the side of the common passage 13 declines to a large extent from a state in which the pilot valve 16FR is open, this decline in the pressure is delayed by means of an action of the orifice 32F and then transmitted to the liquid chamber 39 whereby a closure of the pilot valve 16FR is delayed after the decline in the pressure. It is to be provided that this delay time is set to approximately one second in this embodiment.

Actions of all the valves will be described in more detail hereinafter.

(1) Shift Valve 9

The shift valve 9 is shifted to make a damping force greater only during cornering in this embodiment.

(2) Relief Valve 21

The relief valve 21 is closed under ordinary conditions and opened as the pressure on the side of the cylinder unit 1 reaches a given value or higher. In this embodiment, the given value is set to 160 to 200 kg/cm². In other words, this valve serves as a safety valve for preventing an abnormal rise in the pressure on the side of the cylinder unit 1.

It is noted that the relief valve 21 may be mounted to the cylinder units 1RR and 1RL for the rear wheels, however, in this embodiment, the relief valve 21 can be mounted on the rear wheels with the fact taken into account that the vehicle body is designed such that the pressure on the side of the rear wheels does not become larger than that on the side of the front wheels on condition that the weight on the front side of the vehicle body is allotted considerably heavier than that on the rear side thereof.

(3) Flow Amount Control Valves 15 and 19

The supply amount rate control valve 15 and the discharge flow amount control valve 19 each are spool valves of electromagnetic type and switched from a closed state to an open state or vice versa. It is provided, however, that there is provided a pressure-differential control mechanism so as to make a difference between the pressure on the upstream side and that on the downstream side substantially constant when they are in an open state, because a constant pressure differential is required for control over a flow amount. More specifically, the flow amount control valves 15 and 19 are designed so as to vary with their positions, i.e., with their opening angles, in which their spools displace in proportion to the current to be supplied. The current to be supplied is determined on the basis of a map in advance prepared and stored, which represents the relationship of the flow amount with the current. In other words, the current is supplied in correspondence with a flow amount required at that time.

The flow amount control valves 15 and 19 controls a supply or discharge of the operating liquid to or from the cylinder unit 1, thereby resulting in control of suspension characteristics.

In addition thereto, when an ignition switch is OFF, only control is carried out for lowering a ride height of the vehicle body for a given period of time (in this embodiment, the period of time being set to two minutes) from the time when the ignition switch was turned OFF. In other words, in order to maintain a reference ride height of the vehicle body, control is implemented to prevent the vehicle's ride height from becoming partially higher upon changes in load resulting from getting out or for other reasons.

(4) Safety Valve 26

The safety valve 26 is closed by excitation at the ordinary time and opened at the fail time. For instance, the fail time may include, for example, when a portion of the flow amount control valve 15 or 19 are fixed, when a sensor or other unit, as will be described hereinafter, gets out of order, when the liquid pressure of the operating liquid becomes lost or insufficient, when the pump 11 gets out of order, and so on.

In this embodiment, on top of that, the safety valve 26 is opened in a given period of time, for example, in two minutes, after the ignition switch was turned OFF.

It is to be noted herein that, when the safety valve 26 is opened, closure of the pilot valve 16 is delayed, as have been described hereinabove.

(5) Pilot Valve 16

As have been described hereinabove, the pilot valve 16 is opened in a delayed manner due to the action of the orifices 32F and 32R after the pressure in the common passage 13 has been decreased. At the fail time, for example, when a portion of the flow amount control valves 15 is kept open, this arrangement allows the passages 14FR, 14FL, 14RR and 14RL to be closed on account of a decrease in the pilot pressure resulting from the opening operation of the safety valve 26 and confining the operating liquid in the cylinder units 1FR, 1RL, 1RR and 1RL, respectively, thereby maintaining the ride height of the vehicle body. It is noted as a matter of course that suspension characteristics at this time are fixed in a so-called passive fashion.

Control System

Figure 3:
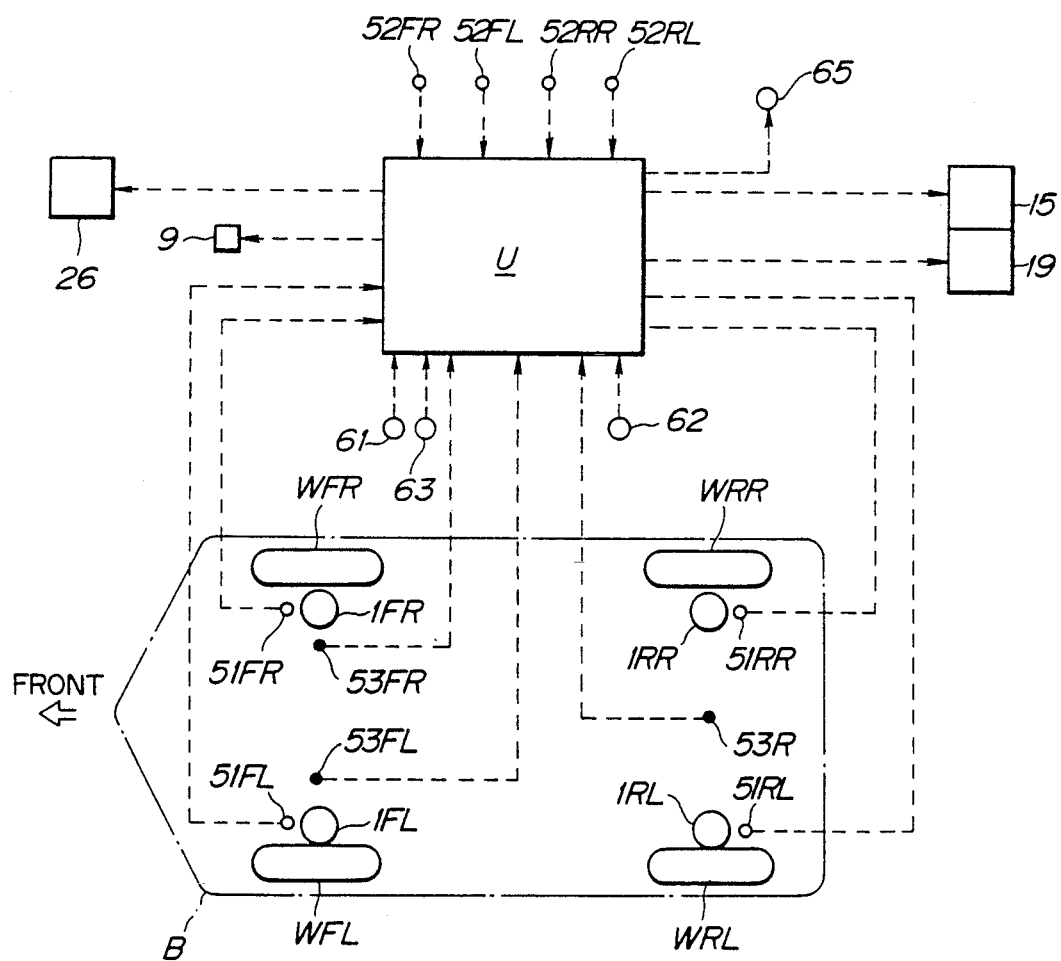
FIG. 3 represents a control system of the circuit of FIG. 1, together with an example of disposition of vertical acceleration sensors.

FIG. 3 represents a control system of the operating liquid circuit as shown in FIG. 1. As shown in FIG. 3, reference symbol "WFR" stands for a right-hand front wheel, "WFL" for a left-hand front wheel, "WRR" for a right-hand rear wheel, and "WRL" for a left-hand rear wheel. A vehicle body B is provided with various sensors, respectively, including ride height sensors 51FR, 51FL, 51RR and 51RL which are disposed in each of the cylinder units 1FR, 1FL, 1RR and 1RL for sensing heights of the vehicle body in the positions of the respective wheels, pressure sensors 52FR, 52FL, 52RR, and 52RL for sensing the pressures in the liquid chambers 5 of the respective cylinder units 1FR, 1FL, 1RR and 1RL (see FIG. 1, too), vertical acceleration (G) sensors 53FR, 53FL, 53RR, and 53RL for sensing a vertical acceleration, i.e., acceleration in the vertical direction or a vertical component of acceleration, a vehicle speed sensor 61 for sensing a speed of the vehicle, a steering angle sensor 62 for sensing a steering angle of the steering wheel, and a transverse acceleration sensor 63 for sensing the transverse acceleration acting upon the vehicle body. Reference symbol "U" stands for a control unit consisting of a microcomputer, into which signals are inputted from each of the vehicle's ride height sensors 51FR, 51FL, 51RR, 51RL, the pressure sensors 52FR, 52FL, 52RR, 52RL, the vertical acceleration sensors 53FR, 53FL, 53R, and the sensors 61, 62 and 63, as well as which generates its signal to the switch valves 9 (9FR, 9FL, 9RR, 9RL), the supply flow amount control valves 15 (15FR, 15FL, 15RR, 15RL), the discharge flow amount control valves 19 (19FR, 19FL, 19RR, 19RL), an alarm 65, such as an alarming lamp, a buzzer or the like, and the safety valve 26.

It is provided, however, that FIG. 3 represents two vertical acceleration sensors 53FR and 53FL disposed on the forward side of the vehicle body B as indicated by the dot-and-dash line in FIG. 3 on the axis of the front wheels and in substantially bilaterally symmetrical positions from the central line of the body passing through the gravitational center in the longitudinal direction thereof and one vertical acceleration sensor 53R disposed on the rearward side of the vehicle body B on the axis of the rear wheels and at a substantially halfway position with respect to the central line in the longitudinal direction of the body. The three vertical acceleration sensors are set so as to form a one virtual plane representing the vehicle body B which is an approximately horizontal plane—in other words, so as to be located at substantially the same height.

Figure 4:
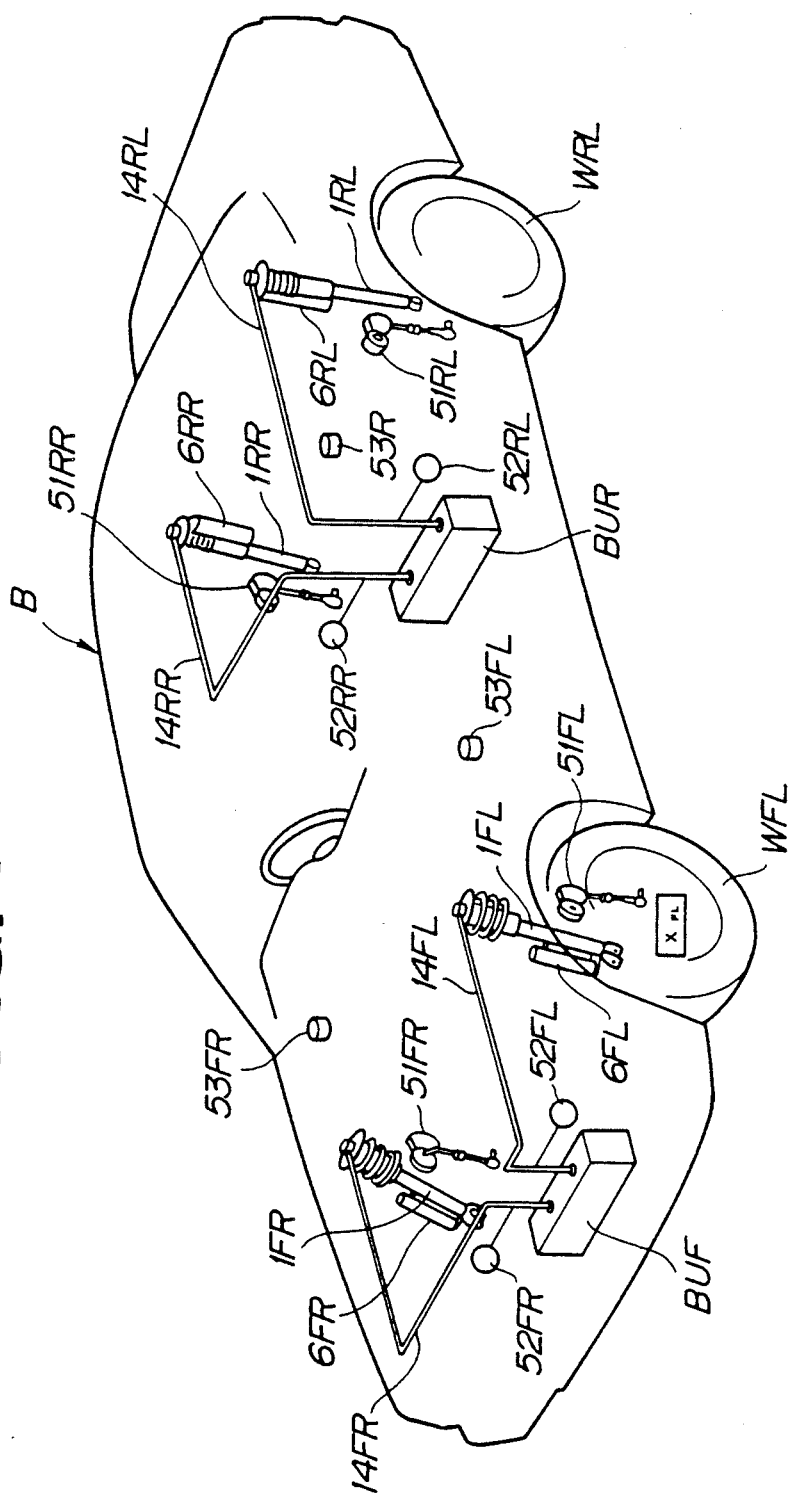
FIG. 4 is a perspective view showing another example of disposition of the vertical acceleration sensors.

FIG. 4 shows another example of the disposition of three vertical acceleration sensors 53FR, 53FL, and 53R. As shown in FIG. 4, the two vertical acceleration (G) sensors 53FR and 53FL located in the right-hand and left-hand positions on the front side of the body, on the one hand, are disposed in the right-hand and left-hand end portions of an instrument panel in the vehicle compartment, respectively. The two vertical acceleration sensors 53FR and 53FL are further located in the positions substantially bilaterally symmetrical with respect to the central line of the body in its longitudinal direction. The vertical acceleration sensor 53R, on the other hand, is located in a trunk room formed in a position rearward of the vehicle compartment and is disposed on the rear side of the body and on the substantially central line in the longitudinal direction of the body.

Referring to FIG. 4, reference symbol "BUF" denotes a valve unit in which at least flow amount control valves 15FR, 15FL, 19FR and 19FL for the front wheels are incorporated, and reference symbol "BUR" denotes a valve unit in which at least flow amount control valves 15RR, 15RL, 19RR and 19RL for the rear wheels are incorporated.

Figure 5:
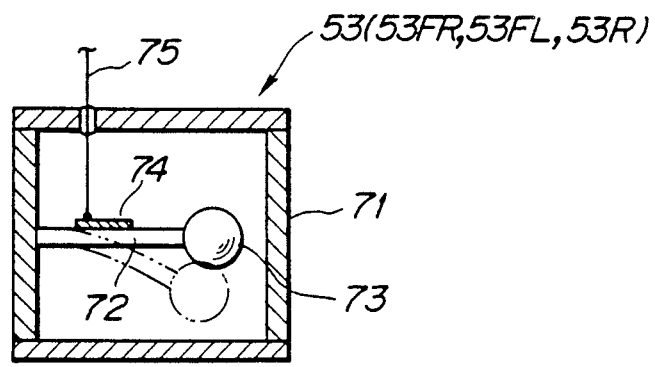
FIG. 5 is a sectional view showing one example of the acceleration sensor.

Turning now to FIG. 5, there is shown a structure of the vertical acceleration (G) sensor 53 (53FR, 53FL, and 53R). The vertical acceleration sensor 53 comprises a casing 71, a beam 72 disposed in the casing 71, and a weight 73. The beam 72 is composed of an elastic member, and one end of the beam 72 is fixed to the casing 71 while the weight 73 is mounted on the other end thereof, or a free end thereof. To the beam 72 is attached a warping gauge 74. The vertical acceleration sensor 53 having the above structure is used in such a state that the casing 71 is fixed to the body B. This arrangement of the vertical acceleration sensor 53 allows the beam 72 to warp as shown by a two-dot-and-dash line in FIG. 5 when acceleration in the vertical direction acts upon the body B and an extent of the acceleration in the vertical direction is sensed by means of the warping gauge 74 as a warped amount of the beam 72, then leading the sensed value to the control unit U through a lead wire 75.

Active Control

An example of control over the suspension characteristics on the basis of output of each sensor will be described with reference to FIGS. 6 to 8, and this corresponds to the content of step P16 in FIG. 11.

The control content may roughly be broken down into three control modes: a first control mode of controlling the posture of the vehicle body B on the basis of output from the vehicle's ride-height sensor, a second control mode of controlling ride comfort on the basis of output from the vertical acceleration (G) sensors, and a third control mode of controlling the warping of the vehicle body B on the basis of output of the pressure sensor.

(1) First Control Mode (Control over Signals From Vehicle's Ride-Height Sensor)

This control mode comprises control over three components of the posture of the body, namely, a bounce component, a pitch component, and a roll component of vibration, each of which may be regulated by feedback control by means of PI control.

For the control over the three components of vibration in the posture of the body, the way of dealing output from each of the vehicle's ride-height sensors is indicated by plus (+) or minus (−) symbols on the left side of each of a bounce control section, a pitch control section, and a roll control section in the drawing. The symbols (+) and (−) indicated on the right side thereof represent control to be carried out by each of the control sections for regulating changes in the posture of the body and these symbols are opposite to those provided on the left side of each of the control sections in the drawing.

In other words, for the control over the bounce component of the posture of the body, the PI control is carried out in such a manner that the sum of the vehicle's ride heights on its right-hand and left-hand front wheel sides and the sum of the vehicle's ride heights on its right-hand and left-hand rear wheel sides are brought into agreement with a corresponding reference ride height. For the control of the pitch component of the posture of the body, the PI control is carried out in such a manner that the difference of the sum by adding the vehicle's ride heights on the right-hand and left-hand rear wheel sides of the body from the sum obtained by adding the vehicle's ride heights on its right-hand and left-hand front wheel sides thereof gives zero. For the control of the roll component of the posture of the body, the PI control is implemented such that the sum of the vehicle's ride height on its right-hand front wheel side and the vehicle's ride height on its right-hand rear wheel side is brought into agreement with the sum of the vehicle's ride height on the left-hand front wheel side and the ride height on the left-hand rear wheel side—in other words, such that the roll component of vibration gives a target rolling angle $T_{ROLL}$.

The control values obtained for three of the foregoing PI control are given for each of the four cylinder units 1 and the control values for each cylinder unit 1 are added and determined as four flow amount signals $Q_{XFR}$, $Q_{XFL}$, $Q_{XRR}$ and $Q_{XRL}$ for final control over the posture of the vehicle body.

(2) Second Control Mode (Control over Signals from Vertical Acceleration (G) Sensors)

This control mode is to prevent impairment of ride comfort resulting from the control over the posture of the body as have been described in item (1) above. Thus, for this control, the feedback control (in this embodiment, proportional control) is carried out so as to regulate acceleration in the vertical direction for the control over the posture of the body corresponding to three components: the bounce component, the pitch component, and the roll component of vibration, as have been described in item (1) above. In this case, it is preferred to set control gains $K_{B3}$, $K_{P3}$ and $K_{R3}$ as values different from each other (for example, $K_{B3} > K_{R3} > K_{P3}$) so as to permit an appropriate control of the bounce, pitch, and roll components of vibration of the body.

It is noted herein that, as only three vertical acceleration (G) sensors are provided for this second control mode, in this embodiment, there is used an arithmetic mean of the vertical acceleration on the right-hand and left-hand front side of the body as acceleration in the vertical direction on the front side for the pitch control.

For the roll control mode, only the acceleration in the vertical direction on the right-hand and left-hand front side can be used while the acceleration in the vertical direction on the rear side is not used.

It is to be understood that, since the rolling of the body occurs on the side of the rear wheels after on the side of the front wheels (presuming that the front wheels are steered), it is preferred to carry out the roll control on the rear wheel side in a somewhat delayed manner after the control mode of the roll component on the front wheel side has started. In this case, furthermore, a control gain on the side of the front wheels may be changed from that on the side of the rear wheels in such a manner that the control gain on the rear wheel side becomes smaller than the control gain on the front wheel side. It is also possible that a time delay and the control gain may be variable in accordance with a running state such as a coefficient of friction on pavement, a steered angle, a velocity of steered angles, a vehicle velocity and so on.

From the standpoint of the fact that rolling on the front wheel side occurs earlier than that on the rear wheel side, it is preferred that the two vertical acceleration sensors be disposed on the left-hand and right-hand front sides of the body rather than on the left-hand and right-hand rear side of the body.

In the second control mode, too, the control values are obtained for each of the four cylinder units 1 by the above three proportional control. Then the control values for each of the cylinder units 1 are then added and the four added values are determined eventually as flow amount signals $Q_{GFR}$, $Q_{GFL}$, $Q_{GRR}$ and $Q_{GRL}$ for the control modes for the respective wheels.

As have been described hereinabove, the control over the roll component of vibration on the rear wheel side of the body is carried out in such a somewhat delayed manner after commencement of the control over the roll component on the front wheel side. Thus, as shown in FIG. 6, the flow amount signals utilizing control gains L and Q can be controlled at an initial stage of steering immediately before the flow amount signals $Q_{GFR}$, $Q_{GFL}$, $Q_{GRR}$ and $Q_{GRL}$ are given. In other words, the control gain L for the front wheels is always set to "1" even if the vehicle is running straight or cornering, while the control gain Q for the rear wheels are set to "1" in an ordinary case and set to a value smaller than "1" only at an initial stage of cornering, for example, to "0.8" (decreasing the control gain) or "0" (delayed). It is further possible to provide only the flow amount signals for the rear wheels from the roll control section with a delay circuit D which can be arranged so as to operate at an initial stage of steering, thereby executing this delay, while to be suspended at the time other than the initial stage of cornering, thereby executing no delay.

Figure 7:
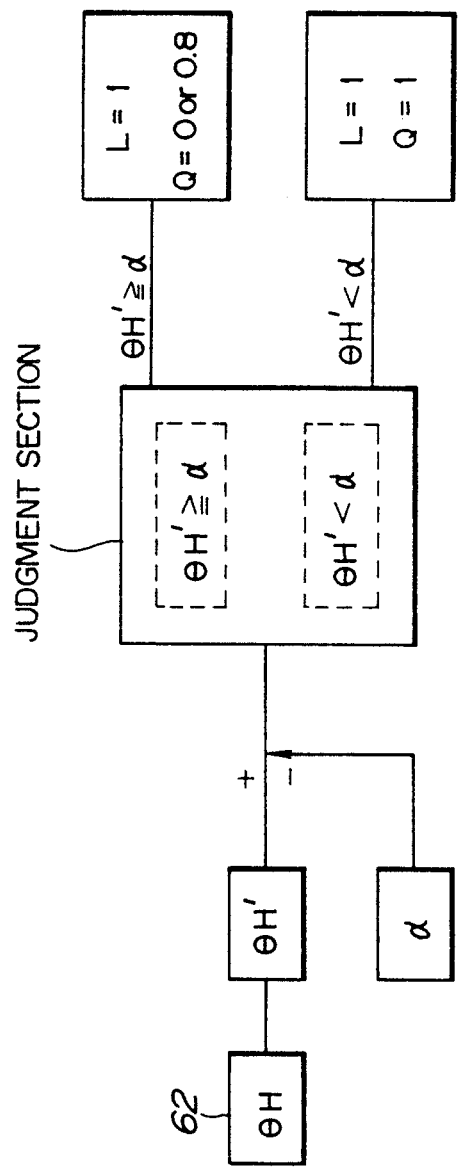

FIG. 7 shows a block diagram showing a control system for determining the control gains L and Q and for operation or suspension of the delay circuit D. As shown in FIG. 8, reference numeral 62 denotes a sensor for sensing a steered angle, $\theta_H$, of a steering wheel (see FIG. 3), and a velocity of the steered angle, $\dot{\theta}_H$, is obtained by differentiating the steered angle $\theta_H$ of the steering wheel. When the velocity of the angle $\dot{\theta}_H$, is judged by a judgment section to be equal to or larger than a reference value, on the one hand, the control gain L is set to "1" while the control gain Q is set to "0" (or "0.8"). Furthermore, the delay is executed together with the settings. When the velocity of the steered angle, $\dot{\theta}_H$, is judged by the judgment section to be smaller than the reference value, $\alpha$, on the other hand, the two control gains L and Q are set each to "1" and no delay is executed at this time.

(3) Third Control Mode of Controlling the Warping (Control over Pressure Signals)

The third control mode is to control the warping of the vehicle body B. In other words, the pressure acting upon each of the cylinder units 1 corresponds to a load applied to each of the respective wheels so that control of the warping of the body B resulting from the load is carried out so as to make the warping unlikely to become larger.

More specifically, this control mode basically is carried out by implementing feedback control in the direction in which a ratio of the difference of the pressures on the sides of the right-hand and left-hand front wheels to the sum of the pressures thereof is brought into agreement with a ratio of the difference of the pressures of the right-hand and left-hand rear wheels to the sum of the pressures thereof. And the control ratio of an warped amount on the front side of the body to a warped amount on the rear side thereof is determined by correction using a correction coefficient $\omega F$, and a control ratio of the control over the posture of the body as have been described in the item (1) above to the control over ride comfort as described in item (2) above is given by correction with a correction coefficient $\omega A$. In the control for regulating this warping, the control values are determined eventually as flow amount signals $Q_{PFR}$, $Q_{PFL}$, $Q_{PRR}$ and $Q_{PRL}$ for each of the four cylinder units 1.

Each of the flow rate signals for the control over the posture of the body, for the control over ride comfort, and the control over the warping for each of the four cylinder units 1 is eventually added to each other and determined as final flow amount signals $Q_{FR}$, $Q_{FL}$, $Q_{RR}$ and $Q_{RL}$ and each of the flow rate control valves 15 and 19 are controlled so as to allow a flow amount to correspond to each of the final flow amount signals $Q_{FR}$, $Q_{FL}$, $Q_{RR}$ and $Q_{RL}$, respectively.

(4) The control gains for the control formulas used for the foregoing explanation of FIG. 6 can be switched by a control system as will be described as will be described with reference to FIG. 8.

Figure 9:
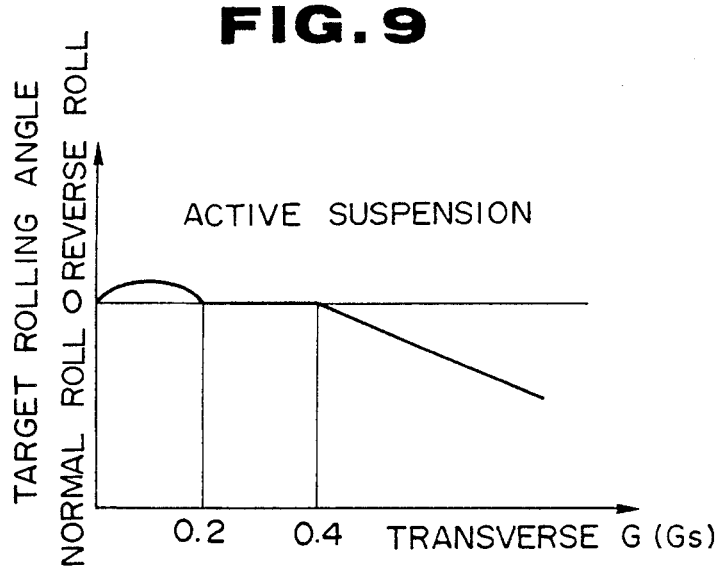
FIG. 9 represents an example of roll characteristic in the vehicle of an active suspension type.
Figure 10:
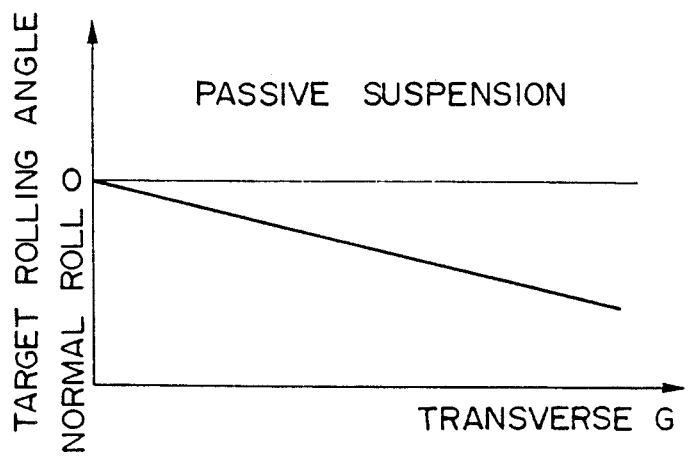
FIG. 10 represents an example of roll characteristic in the vehicle of a passive suspension type.

The steering angle $\theta_H$ of the steering wheel is multiplied by the vehicle velocity V, and a value $S_1$ is given by subtracting a reference value $G_1$ from the product, $\theta_H \cdot V$, and the value $S_1$ is input into the cornering judgment section. A value $G_2$ is given by subtracting a reference value $G_2$ from the current transverse acceleration, Gs, and inputted into the cornering judgment section. When $S_1 \geq 0$ $S_2 \geq 0$, on the one hand, the cornering section judges that the vehicle is cornering and generates a signal $S_a$ for changing the suspension characteristic to a harder state while setting each of control constants $K_i$ ($i=B_1$, $P_1$, $R_1$, $B_3$, $P_3$, $R_3$) to a value $K_{hard}$, thereby shifting the damping-force shift valve 9 to the close position in order to improve the ability to follow the control of the flow amount to each of the liquid pressure cylinders 3. Furthermore, there is set a value corresponding to the transverse acceleration at that time from a map which stores the target roll angles $T_{ROLL}$. FIG. 9 shows one example of the map. It is noted that the normal roll angles become larger as the transverse acceleration increases for the vehicle with the passive suspension. When the value $S_1 < 0$ or $S_2 < 0$, on the other hand, the cornering judgment section judges that the vehicle is running straight and generates a signal $S_b$ for changing the suspension characteristic to a softer state, thereby shifting the damping-force shift valve 9 to the cornering position. Further, the control coefficients $K_i$ are set each to a usual value $K_{soft}$ and the target roll angle $T_{ROLL}$ is set to 0.

Trouble Control

Whether the supply control valve 15 is fixed while it is kept open, in other words, whether the operating liquid is kept supplied to the corresponding cylinder unit 1, is checked by the procedure which follows.

First, a total stroke amount of each of the rebounding and bumping wheels is set to 80 mm and the value on the rebounding side is provided with plus (+) symbol while the value on the bumping side is provided with minus (−) symbol. The vehicle's ride height sensor 51 senses the bounce and bump components and output of the sensor 51 ranges from −80 mm to +80 mm as the stroke amount of the wheel.

Given the foregoing, the supply control valve 15 is judged as being in trouble, namely, as being fixed in an open state, when the following four conditions are met, in which a reference ride height of the vehicle is given as Ho when neither bump nor rebound occur, a current ride height as H(t), the ride height immediately prior to the current ride height as H(t−Δt), a current pressure within the cylinder unit as P(t), and the pressure within the cylinder unit immediately prior to the current pressure as P(t−Δt).

Condition a: The rebound occurs, i.e., $H(t) - Ho > 0.$

Condition b: The rebound further occurs from the state of Condition a, i.e., $H(t) - H(t - \Delta t) > 0.$ Condition c: The pressure within the cylinder unit is elevating, i.e., $P(t) - P(t - \Delta t) > 0.$ Condition d The state of Condition c continues for a given time (for example, 300 msec).

When it is sensed that the supply control valve 15 is fixed, the alarm 65 (FIG. 3) such as an alarm lamp or an alarm buzzer may be operated to merely notify the driver. It is further preferred that fail control be carried out. The fail control may be implemented by releasing the pressure on the side of the accumulator 22 as well as by operating the alarm 65. Concurrently with the opening operation of the safety valve 26, signals are given to all control valves 15 and 19 for full open for a given period of time, for example, for one second. Further, the pilot valve 16 is maintained in an open state for a given period of time (for approximately one second) by means of the delay action of the orifice 32 as have been described hereinabove. During that period of time, the operating liquid in the cylinder 2 is discharged through the supply control valve 15 or the discharge control valve 19, thereby the ride height of the body is lowered to its lowest position, in other words, down to a bump stopper. Thereafter, the pilot valve 16 is closed within short so that the ride height of the body is maintained in its lowest position.

At the fail time, the active control cannot be done in a good fashion. Thus, it may be arranged such that the active control itself cannot be executed and it cannot be returned until it is repaired, for example, by storing the fail time in an unvolatile memory and turning the ignition on again after once the ignition was turned off. As a matter of course, if one of the supply control valves 15 is judged to be in trouble, the fail control is carried out in the manner as have been described hereinabove.

In this example, the trouble can be sensed when the discharge control valve 19 is fixed in an open state. In this case, to the contrary in case of the flow amount control valve 15, attention is paid to the point that the pressure in the cylinder unit 1 should be elevated when the wheel is bumped. Thus, the discharge control valve 19 is judged to be in trouble when the following four conditions are met.

Condition e: The bump occurs, i.e., $$H(t)-Ho<0.$$

Condition f: The bump further occurs from the state of Condition e, i.e., $$H(t)-H(t-\Delta t)<0.$$

Condition g: The pressure within the cylinder unit is lowering, i.e., $$P(t)-P(t-\Delta t)<0.$$

Condition h: The state of Condition g continues for a given time (for example, 300 msec).

When it is judged that the discharge control valve 19 is in trouble, the control can be made by prohibiting the active control from being returned until it is repaired, in the same manner as in the fail control like the supply control valve 15.

Figure 11:
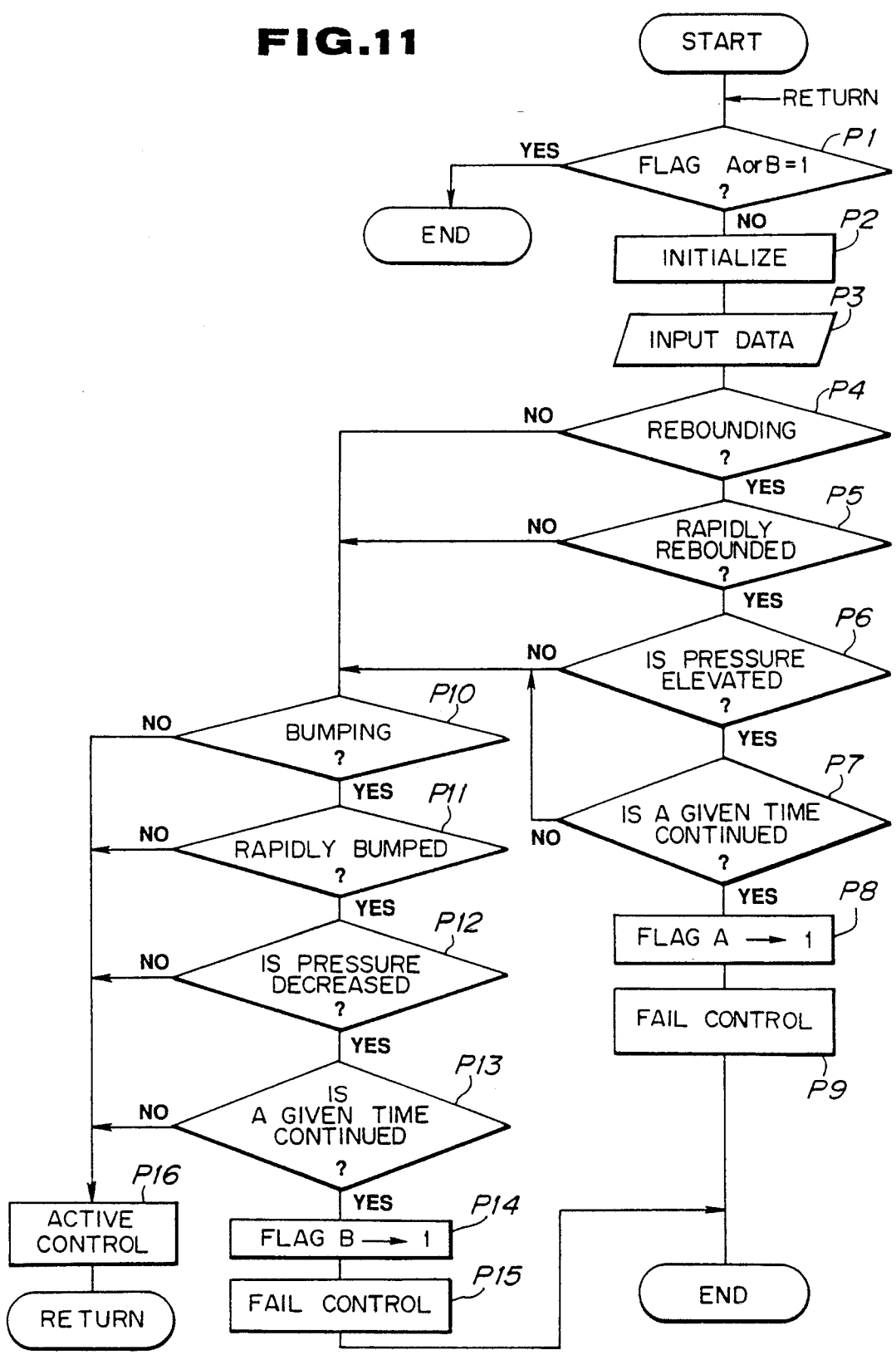
FIGS. 11 and 12 each are a flow chart showing a control example of the present invention.
Figure 12:
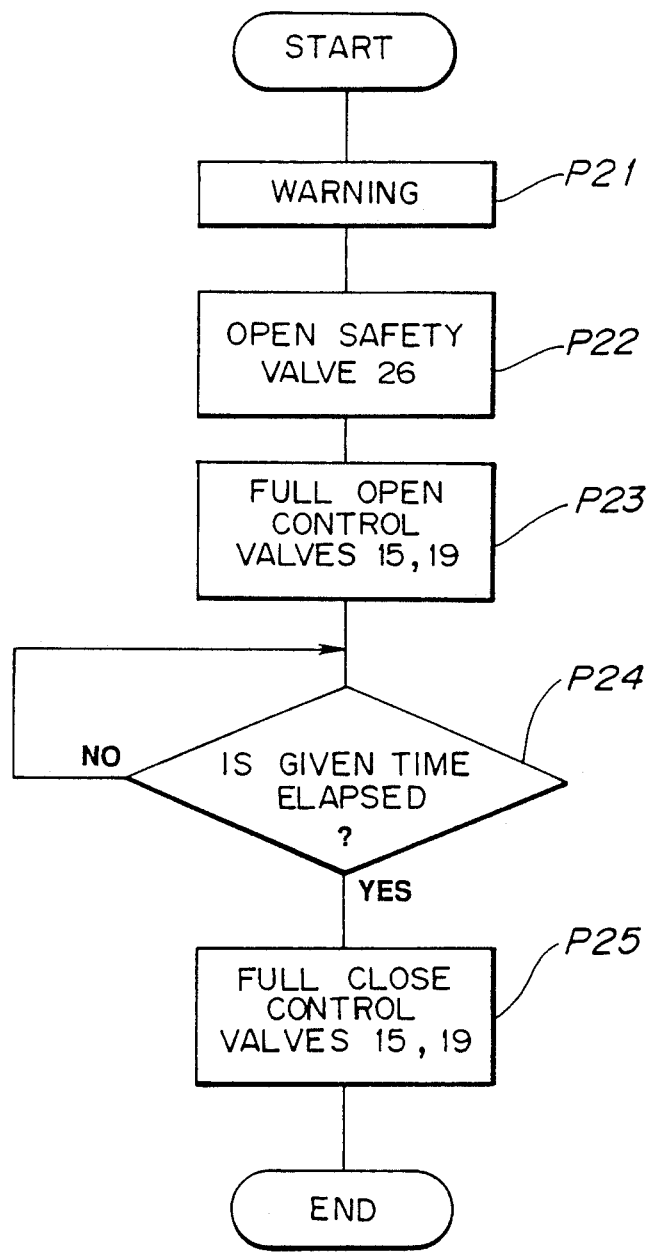
Figure 13:
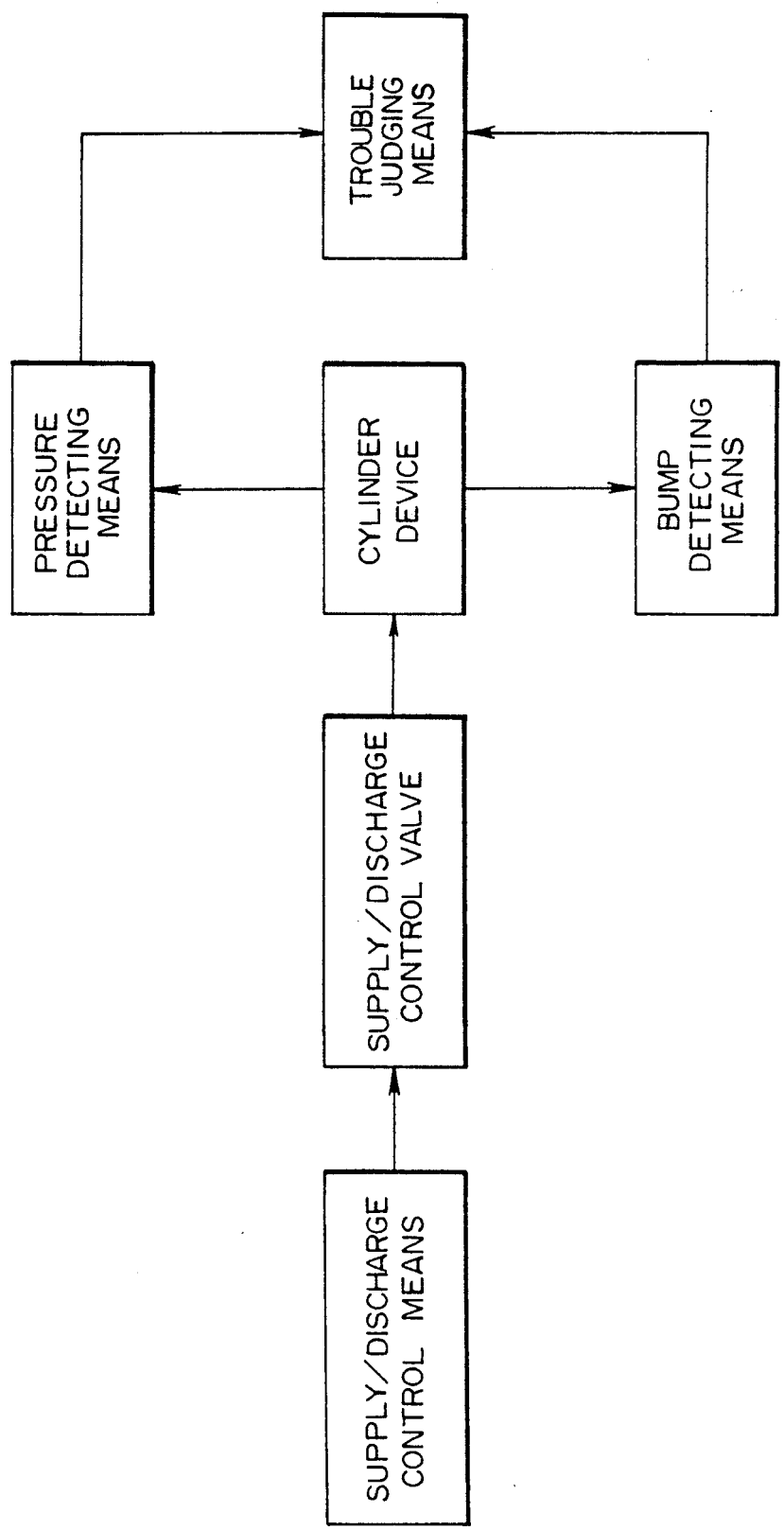
FIG. 13 is a block diagram showing a whole construction of the present invention.

Flow Charts (FIGS. 11 & 12)

The trouble control for the supply control valve 15 and the discharge control valve 19 will be described with reference to the flow chart as shown in FIG. 11.

First, the system is started by turning the ignition switch on. At step P1, whether flag A or B is "1" or not is judged. The flag A is set to "1" when it is judged that the supply control valve 15 is in trouble while the flag B is set to "1" when the discharge control valve 19 is judged to be in trouble. They are stored in an unvolatile memory.

When it is judged at step P1 that the flag A or B is set to "1", on the one hand, the control concludes to prohibit the active control. When it is judged that neither flag A nor flag B are set to "1", the system is initialized at step P2 and the control valve 26 is closed at this time.

Then the flow proceeds to step P3 where all data are input and all signals from the sensors are read. At steps P4 to P7, the trouble control is implemented for the supply control valve 15, in other words, it is judged whether the foregoing conditions to d are met or not. If YES at all the steps P4 to P7 (when it is judged that all the conditions a to d are met), then the flow advances to step P8 and flag A is set to "1". Thereafter, at step P9, the fail control is carried out and the control ends in the same state.

When it is judged NO at all steps P4 to P7, in other words, when either of the conditions a to d is not met, the flow proceeds to step P10 where it is judged whether or not the condition e above is met. When YES at step P10, the flow goes to step P11 where it is judged whether or not the condition f above is satisfied. After it is judged at step P11 that the condition f is met, whether the condition is met or not is then judged at step P12. When YES at step P12, then the flow goes to step P13 where it is judged whether or not the condition h is satisfied. When it is judged at step P13 that the condition h also is met, then flag B is set to "1" at step P14 and the fail control is executed at step P15. The control then concludes.

Figure 6:
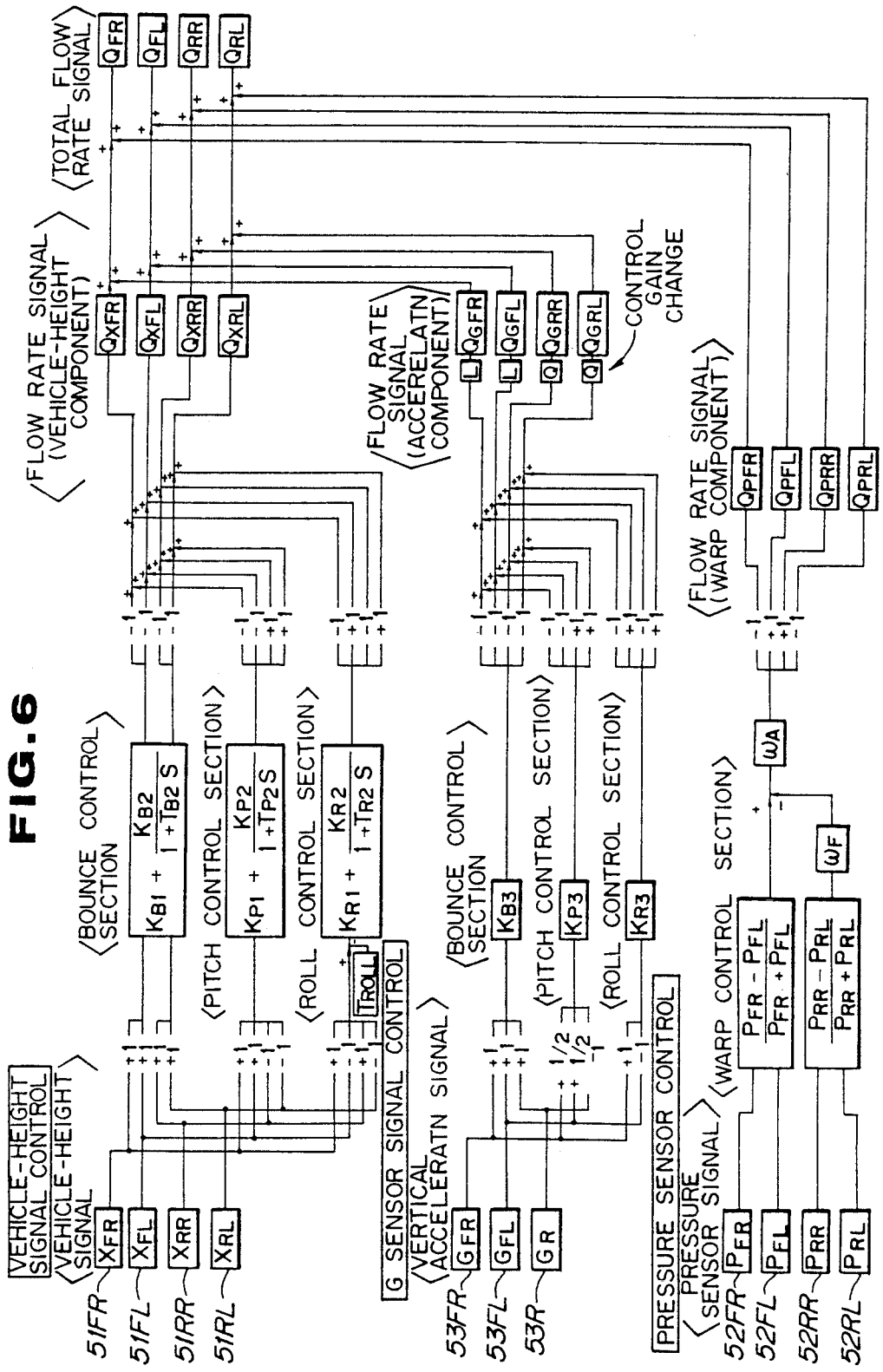
FIGS. 6-8 each represent a control system showing one example for carrying out active control.
Figure 8:
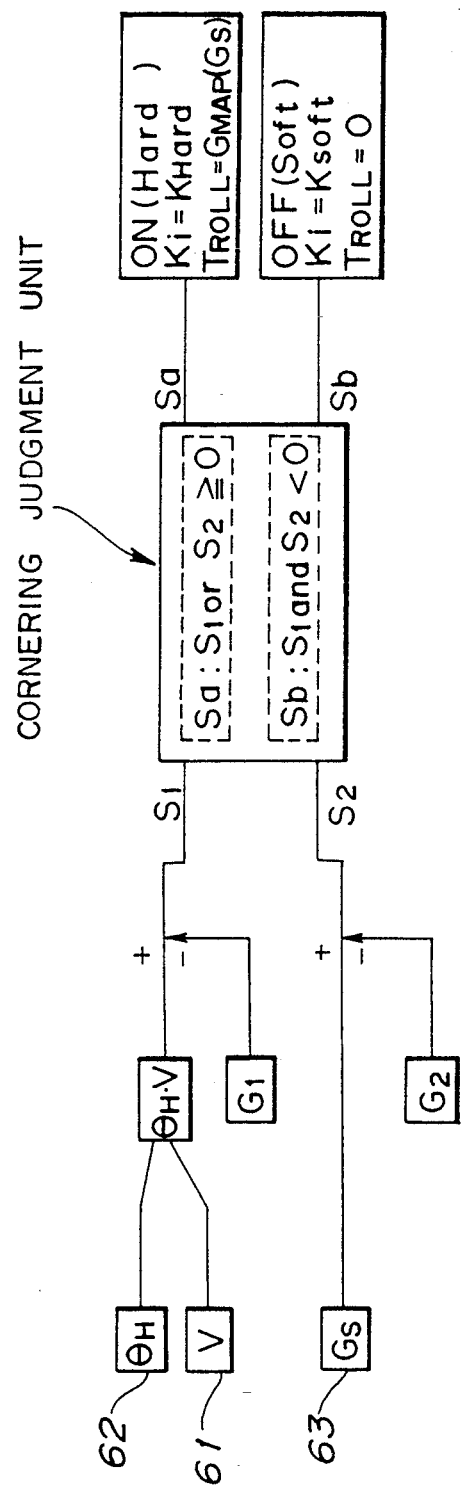

On the contrary, when it is judged at steps P10 to P13 that either of the conditions e to h is not met, the flow advances to step P16 where the active control is carried out in the manner as shown in FIGS. 6 to 8.

FIG. 12 shows the flow chart for the fail control as shown at steps P9 and P15 in FIG. 11. At step P21, the alarm 65 is operated to notify the drive of the fail time. Then the safety valve 26 is opened at step P22 and each of the control valves 15 and 19 are full open at step 23. When the signals for full opening are outputted, then the ride height is lowered.

Then at step P24, it is judged whether or not a given period of time in this example, one second—has elapsed after the process at step P23. If NO at step P24, the flow is returned to step P24, on the one hand, and the full open states of the control valves 15 and 19 are maintained. When the given period of time has elapsed, on the other, the flow proceeds to step P25 where the control valves 15 and 19 are brought to a full open state. Signals for closing all the control valves 15 and 19 are generated to them, and then the control ends.

Although the foregoing description is directed to the embodiment where the supply control valve 15 is disposed separately and independently from the discharge control valve 19, the supply control valve 15 and the discharge control valve 19 may be constructed using one electromagnetic valve having three ports and three positions.

It is to be understood that the foregoing text and drawings relate to embodiments of the invention given by way of examples but not limitation. Various other embodiments and variants are possible within the spirit and scope of the present invention.

What is claimed is:

1. A suspension apparatus of a vehicle, comprising:
   a cylinder unit interposed between a sprung weight and an unsprung weight for changing a ride height by supplying or discharging an operating liquid;
   a supply/discharge control valve for supplying to or discharging from the cylinder unit;
   a supply/discharge control means for controlling supply of the operating liquid to or discharge of the operating liquid from the cylinder unit by controlling the supply/discharge control valve on the basis of a predetermined condition;
   a rebound detecting means for detecting a rebound of a wheel and for detecting further rebounding of the wheel after an initial rebound of the wheel is detected;
   a pressure detecting means for detecting a pressure in the cylinder unit; and
   a trouble detecting means for detecting that the supply/discharge control valve is operating outside of predetermined normal values when the pressure detected by the pressure detecting means continues in a elevated state for a given period of time when the rebound is detected by the rebound detecting means.

2. A suspension apparatus as claimed in claim 1, wherein a gas spring is connected to the cylinder unit.

3. A suspension apparatus as claimed in claim 2, wherein a plurality of the gas springs are connected in parallel to each other to one cylinder unit.

4. A suspension apparatus as claimed in claim 3, wherein an orifice is interposed between the cylinder unit and each of the gas springs.

5. A suspension apparatus as claimed in claim 4, wherein a variable orifice is interposed between the cylinder unit and a portion of the gas springs, the variable orifice being controlled so as to make an effective opening area smaller during cornering than during straight driving.

6. A suspension apparatus as claimed in claim 2, wherein an orifice is interposed between the cylinder unit and the gas spring.

7. A suspension apparatus as claimed in claim 6, wherein a variable orifice is interposed between the cylinder unit and the gas spring so as to be controllable on the basis of a predetermined condition.

8. A suspension apparatus as claimed in claim 1, further comprising:
a reservoir tank for storing the operating liquid;
a supply passage connecting the reservoir tank to a supply control valve of the supply/discharge control valve;
a relief passage connecting the reservoir tank to a discharge control valve of the supply/discharge control valve;
a pump connected to the supply passage for pumping up the operating liquid from the reservoir tank and supplying the operating liquid to the supply passage; and
a main accumulator connected to the supply passage for storing the operating liquid of a high pressure pumped up by the pump.

9. A suspension apparatus as claimed in claim 8, wherein a bypass bypassing the discharge control valve and communicating the cylinder unit with the reservoir tank; and
a relief valve is connected to the bypass, the relief valve being arranged so as to be opened when the pressure in the cylinder unit reaches a given value or higher.

10. A suspension apparatus as claimed in claim 8, further comprising a safety valve for releasing a pressure in the main accumulator to the reservoir tank.

11. A suspension apparatus as claimed in claim 10, wherein the safety valve is connected to the relief passage.

12. A suspension apparatus as claimed in claim 11, wherein a sub-accumulator is connected to the relief passage.

13. A suspension apparatus as claimed in claim 11, wherein there is provided with a trouble control means for opening the safety valve when the trouble detecting means detects that the supply/discharge control valve is operating outside of said predetermined normal values.

14. A suspension apparatus as claimed in claim 13, wherein the trouble control means is controlled so as to open all supply/discharge control valves.

15. A suspension apparatus as claimed in claim 14, wherein the trouble control means is controlled so as to open all the supply/discharge control valves for a given period of time and to close all of them after elapse of the given period of time.

16. A suspension apparatus as claimed in claim 8, wherein a blocking means is interposed between the supply control valve and the cylinder unit for blocking a communication of the supply control valve with the cylinder unit by delaying from reduction in a pressure of the main accumulator when the pressure of the main accumulator is reduced.

17. A suspension apparatus as claimed in claim 16, wherein the blocking means comprises a pilot valve and an orifice;
the pilot valve being interposed between the supply control valve and the cylinder unit for operating opening or closing the blocking means using a pressure of the main accumulator as a pilot pressure; and
the orifice being connected to a pilot passage leading the pilot pressure to the pilot valve.

18. A suspension apparatus as claimed in claim 8, further comprising:
a safety valve for releasing a pressure in the accumulator to the reservoir tank;
a blocking means interposed between the supply control valve and the cylinder unit for blocking communication of the supply control valve with the cylinder unit by delaying reduction in pressure of the main accumulator when the pressure of the main accumulator is reduced;
a trouble control means for opening the safety valve and for opening all of the supply/discharge valves when the trouble detecting means detects that the supply/discharge control valve is operating outside of said predetermined normal values.

19. A suspension apparatus as claimed in claim 18, wherein the trouble control means is controlled so as to open all the supply/discharge control valves for a given period of time and to close all of them after elapse of the given period of time.

20. A suspension apparatus as claimed in claim 1, wherein the rebound detecting means comprises a ride height detecting means for detecting a ride height of a vehicle body, or a stroke position of the wheel with respect to the vehicle body.

21. A suspension apparatus as claimed in claim 1, further comprising a ride height detecting means for detecting a ride height of a vehicle body, or a stroke position of the wheel with respect to the vehicle body;
wherein the supply/discharge control means controls the supply/discharge control valve in such a manner that a mode-corresponding posture corresponding to each of three modes of a posture of the vehicle, three modes being a bounce mode, a pitch mode and a roll mode, obtainable on the basis of output from the ride height detecting means is located so as to comply with a predetermined condition.

22. A suspension apparatus as claimed in claim 21, further comprising an acceleration sensor for detecting a vertical acceleration of the vehicle body;
wherein the supply/discharge control means controls the supply/discharge control valve so as to regulate the vertical acceleration of the vehicle body detected by the acceleration sensor.

23. A suspension apparatus as claimed in claim 22, wherein:
at least three acceleration sensors are mounted so as to detect the vertical acceleration corresponding to each of the three modes; and
the supply/discharge control means controls the supply/discharge control valve so as to regulate the vertical acceleration corresponding to the three modes, obtainable on the basis of at least the three acceleration sensors.

24. A suspension apparatus as claimed in claim 1, wherein:
the supply/discharge control means is a flow amount control valve; and
a control value of the supply/discharge control means is determined as a flow amount signal.

25. A suspension apparatus as claimed in claim 24, wherein the supply/discharge control valve is provided with a pressure-differential adjusting function of adjusting a pressure differential between a pressure on an upstream side and a pressure on a downstream side to a constant value.

26. A suspension apparatus as claimed in claim 24, further comprising:
a ride height detecting means for detecting a ride height of a vehicle body, or a stroke position of the wheel with respect to the vehicle body; and
an acceleration sensor for detecting a vertical acceleration of the vehicle body;
wherein the supply/discharge control means comprises a first control means, a second control means and a third control means;
wherein the first control means determines a control value for the supply/discharge control valve so as to control the supply/discharge control valve in such a manner that a mode-corresponding posture corresponding to each of three modes of a posture of the vehicle, three modes being a bounce mode, a pitch mode and a roll mode, obtainable on the basis of output from the ride height detecting means is located so as to comply with a predetermined condition;
the second control means determines a control value for the supply/discharge control valve so as to regulate the vertical acceleration of the vehicle body detected by the acceleration sensor; and
the third control means determines a control value for the supply/discharge control valve so as to regulate a warp between a front portion and a rear portion of the vehicle body obtained on the basis of output from the pressure detecting means.

27. A suspension apparatus as claimed in claim 26, wherein the sum of the control values determined by the first, second and third control means is determined as a final control value for the supply/discharge control means.

28. A suspension apparatus as claimed in any one of claims 8 to 27, wherein a gas spring is connected to the cylinder unit.

29. A suspension apparatus as claimed in claim 28, wherein an orifice is interposed between the cylinder unit and the gas spring.

30. A suspension apparatus as claimed in any one of claims 1 to 27, further comprising an alarm operable when trouble detecting means detects that the supply/discharge control valve is operating outside of said predetermined normal values.

* * * * *